United States Patent Office.

CHRISTIAN RUDOLPH, OF OFFENBACH-ON-THE-MAIN, GERMANY, ASSIGNOR TO K. OEHLER, OF SAME PLACE.

TETRAZO DYE-STUFF.

SPECIFICATION forming part of Letters Patent No. 396,293, dated January 15, 1889.

Application filed September 3, 1888. Serial No. 284,466. (No specimens.)

*To all whom it may concern:*

Be it known that I, CHRISTIAN RUDOLPH, a subject of the Emperor of Germany, and a resident of Offenbach-on-the-Main, Germany, assignor to the firm of K. OEHLER, in the said city of Offenbach, have invented new and useful Improvements in Coloring-Matter, of which the following is a specification.

My invention consists in the production of blue-black tetrazo dye-stuffs of the sulpho-acids of the amido-cresols. The latter are best produced by the well-known method of Kolbe, (see *Beilstein's Handbuch*, second edition, tome I, page 540,) by the nitrification of sulphureted cresols and following reduction. They show almost the same reactions as the amidophenolsulpho-acids. (See *Beilstein's Handbuch*, second edition, tome I, page 541.)

My way of proceeding is as follows: The sulpho-acids of the amido-cresols are diazotated in the well-known manner and then combined with a naphthylamine. The combinations thus obtained are again diazotated and then combined with the betanaphtholdisulpho-acid R. (see German Patent No. 3,229,) to produce the new blue-black tetrazo dye-stuffs.

Example: Twenty-three pounds of amidocresolsulphate of soda (which can derive either from ortho-meta or para-cresol) and seven pounds of nitrite of soda are dissolved in five hundred pounds of water and allowed to run slowly into an excess of muriatic acid. The diazo compound formed gives to the liquid a yellow-brown color. When the reaction is finished, a solution of twenty pounds of hydrochlorate of naphthylamine is added. The mixture is at the beginning clear, and troubles after a while by the separation of the combination formed. At the ordinary temperature, and in a diluted solution, the reaction goes on slowly for several days. By heating the mass to from 40° to 50° the formation of the compound is accelerated.

The reaction is considered to be completed when a sample filtered off gives no more precipitate after being a little heated or standing for some time.

The precipitate forms dark-green crystals, dissolving in ammonium with a brownish yellow-red, and in concentrated sulphuric acid with a violet-red color. Being insoluble in water, it can be washed, and is then dissolved (still in humid state) in ten pounds of ammonium of seventeen per cent. Add seven pounds of nitrite of soda and pour the whole solution in muriatic acid cooled with ice to 0°.

The intermediate compound precipitates first in the shape of blackish flakes, which change color with the progressing diazotation and appear finally pure red-brown. Arrived at this point of the process, the last step is begun by pouring the diazotated compound into an alkaline solution of thirty-three pounds of R. salt and cooled with ice.

The dye-stuff is formed at once in the shape of a black precipitate, which is filtered, pressed, and dried.

The dye-stuffs form a black-brown powder with bronze luster, and are soluble in water with blue-violet color. By the addition of ammonium the color of the solution changes into pure blue. With concentrated sulphuric acid the dye-stuff shows a green reaction.

These coloring-matters dye wool from violet-blue to blue-black, according to the strength.

Having thus described my invention and the manner of employing the same, what I claim, and wish to secure to me by Letters Patent of the United States of America, is—

The tetrazo dye-stuff herein described, which is produced from the sulpho-acids of the amido-cresols by their combination with naphthylamine, the diazotation of the compound thus obtained and its combination with naphtholdisulpho-acid, and which is a black-brown powder with a bronze luster having the following properties, viz: forming when dissolved in water a blue-violet solution, which by the addition of ammonia is changed to pure blue, showing a green reaction with concentrated sulphuric acid, and dyeing wool from violet-blue to blue-black, according to its strength, substantially as herein specified.

In testimony whereof I have signed my name to this specification in the presence of two subscribing witnesses.

CHRISTIAN RUDOLPH.

Witnesses:
FRANZ HASSLACHER,
CARL DÜRRSTEIN.